March 14, 1939.  W. J. SCHULTZ ET AL  2,150,462
WHEEL RIM REFINISHING MACHINE
Filed Dec. 21, 1936   3 Sheets-Sheet 1
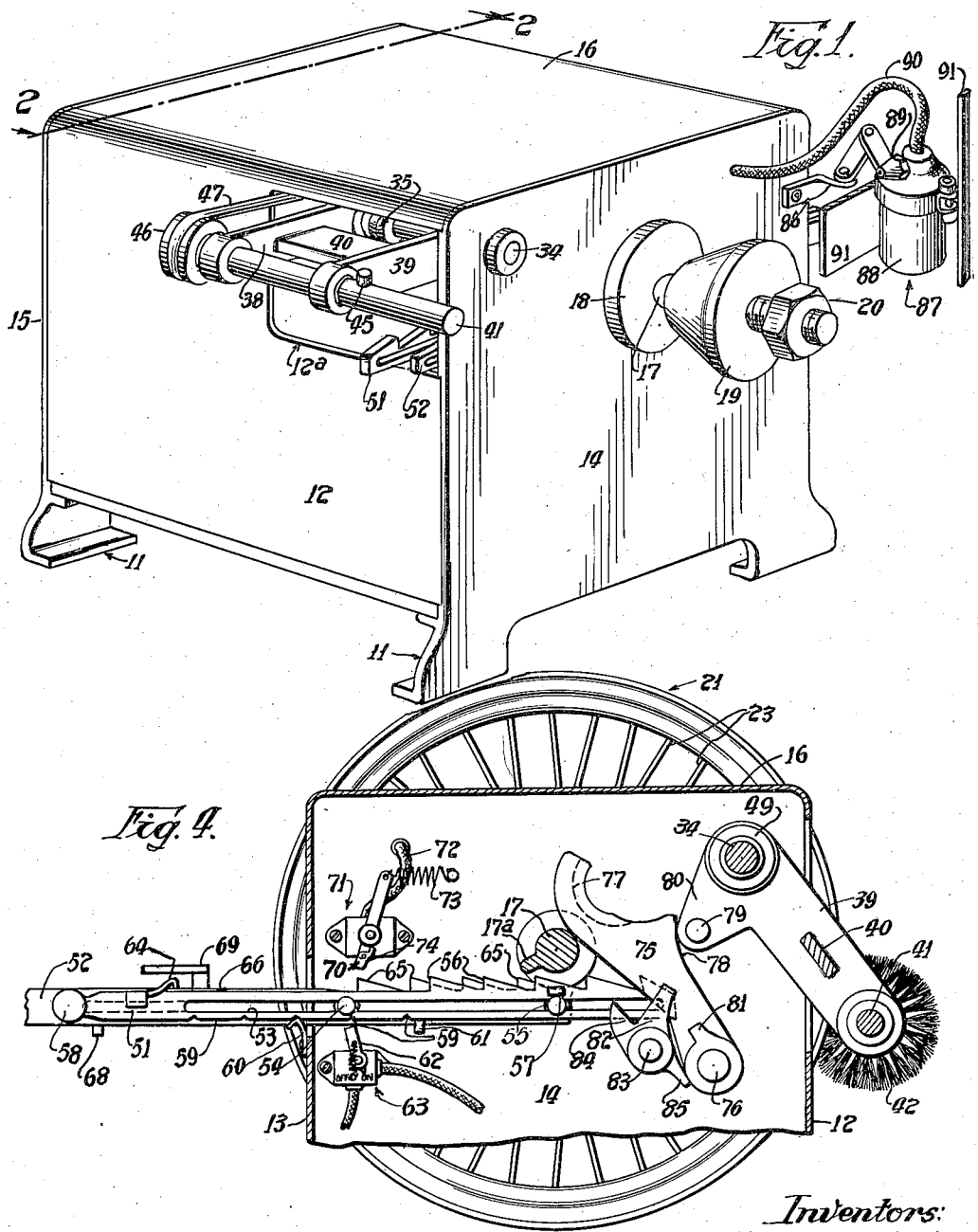
Witness:
E. Camporini
Inventors:
William J. Schultz,
Eli Pedersen,
By: Arthur W. Nelson
Attorney.

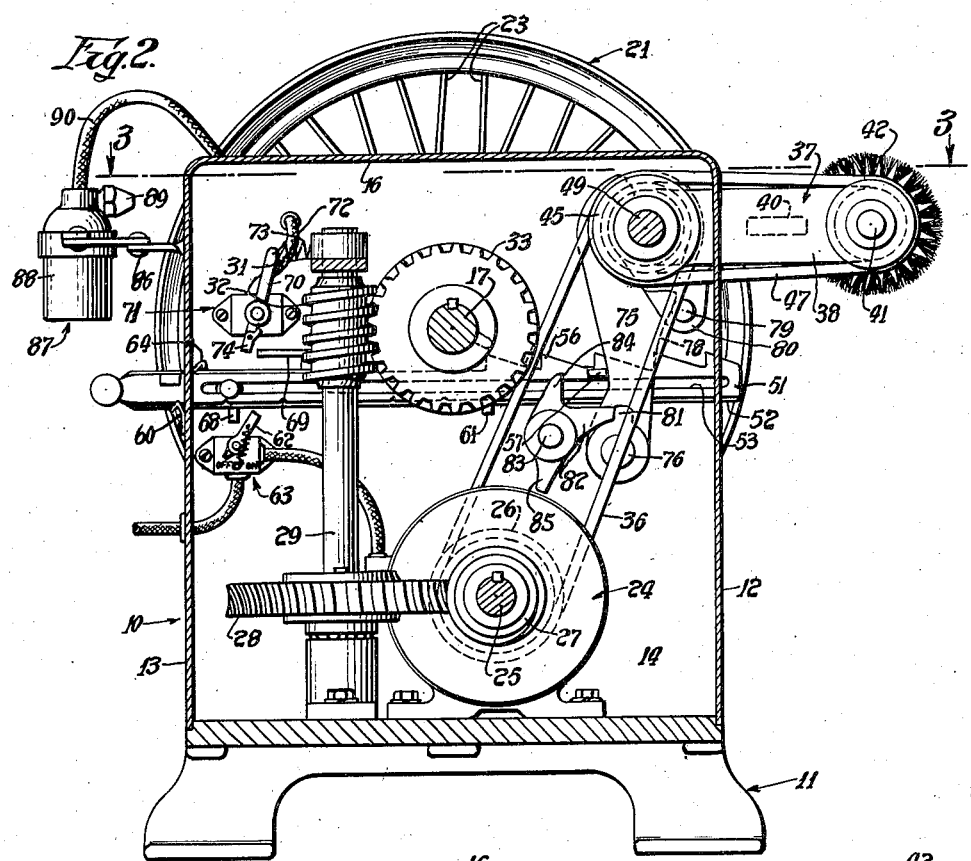
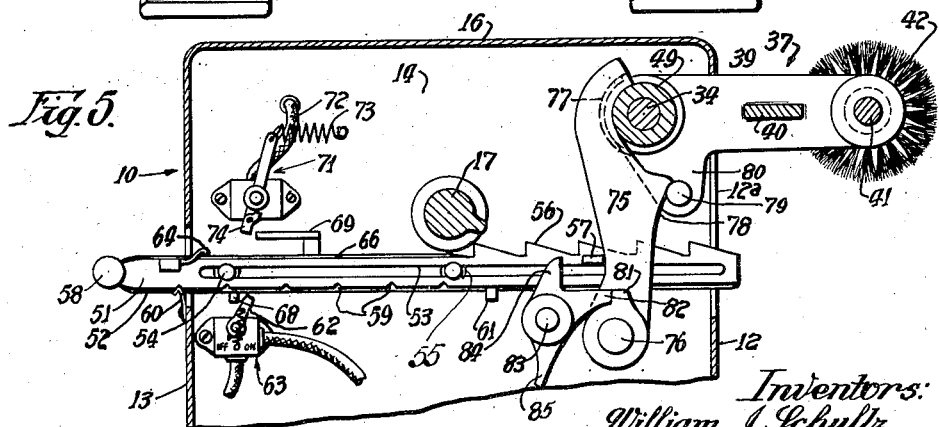

March 14, 1939.  W. J. SCHULTZ ET AL  2,150,462
WHEEL RIM REFINISHING MACHINE
Filed Dec. 21, 1936  3 Sheets-Sheet 3

Inventors:
William J. Schultz,
Eli Pedersen,
By:
Attorney.

Witness:
E. Camporini

Patented Mar. 14, 1939

2,150,462

UNITED STATES PATENT OFFICE 2,150,462

WHEEL RIM REFINISHING MACHINE

William J. Schultz and Eli Pedersen, Chicago, Ill.

Application December 21, 1936, Serial No. 116,908

10 Claims. (Cl. 91—13)

This invention relates to improvements in wheel rim refinishing machines and it consists in the matters hereinafter described and more particularly pointed out in the appended claims.

In the use of pneumatic tired automobile wheels upon snowy or otherwise wet roads, water seeps between the tire beads and rim flanges and will, through capillary attraction, travel to the inside of the channel of the rim. Also, temperature changes produce condensation on the inside of the channel of the rim. Either or both of these conditions will start and promote rust on the inside of the channel of the rim and which rust is much in evidence in making tire changes.

That the rust mentioned is quite injurious to the tube of the tire is recognized in the industry. To protect the tire tube against the action of rust, fabric liner strips or flaps are employed between the tube and casing beads to prevent contact between a part of the tube and the metal of the rim. However, such a strip often shifts laterally so that the tube has actual contact with the rusty metal of the rim.

Should a new tube be used in a casing applied to a rusty rim, the rust soon attacks the tube to weaken the game so that a blowout may result. Often rust builds up to a projection high enough to puncture the tube in use.

One of the objects of the present invention is to provide a machine for refinishing a wheel rim by removing the rust from and thoroughly cleaning the inside of the channel thereof, preparatory to mounting a tire thereon.

Another object of the invention is to provide a simple machine whereby rust may be readily removed from the inside of the channel of a wheel rim and the latter then treated with a rust inhibitor in an expeditious manner at a low cost.

A further object of the invention is to provide a machine of this kind which, after once being set for the rim operated upon and started into operation, is automatic in its operation for its intended purpose.

Still another object of the invention is to provide a machine for this purpose which will handle either drop center base rims or demountable rims, of many different styles and diameters.

The above mentioned objects of the invention, as well as others, together with the several advantages thereof, will more fully appear as the specification proceeds.

In the drawings:

Fig. 1 is a perspective view of a wheel rim refinishing machine embodying one form of our invention with parts of the spray guard plates broken away better to illustrate adjacent parts.

Fig. 2 is a vertical sectional view through the machine as taken on the line 2—2 of Fig. 1 the spray guard plates being omitted for better illustration purposes.

Fig. 4 is a vertical sectional view through a part of the machine as taken on the line 4—4 of Fig. 3.

Fig. 5 is a view similar to Fig. 4 with the parts shown in a different position.

Figure 3:
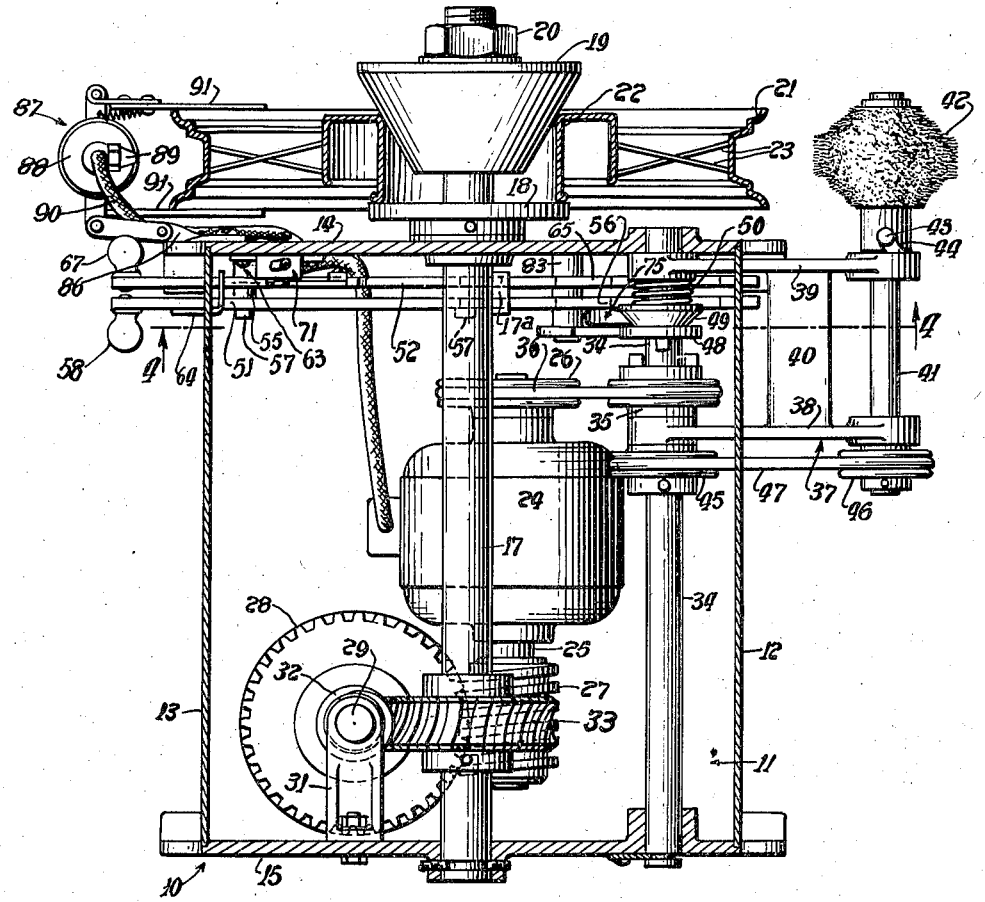
Fig. 3 is a horizontal sectional view through the machine as taken on the line 3—3 of Fig. 2.

Referring now in detail to that embodiment of the invention illustrated in the accompanying drawings: 10 indicates as a whole, the closed top box-like casing of the machine for enclosing certain operating parts of the machine and which casing sets on a suitable base 11. The casing includes front and rear walls 12 and 13, end walls 14 and 15 respectively and a top wall 16.

Journalled in the mid portions of the end walls 14 and 15 is a horizontal shaft 17 which will hereinafter be referred to as the "rim supporting shaft" because it is the shaft to which the rim being refinished, is detachably secured.

As herein shown, that end of the rim supporting shaft extending beyond the end wall 14, carries a wheel supporting means including a backing disk 18 fixed to the shaft, a clamping wedge or cone 19 loose on the shaft and a clamping nut 20 for said wedge or cone. In this instance the rim 21 being operated upon is a drop center base rim forming a part of a wheel that includes a hub shell 22 and spokes 23 connecting the hub shell and rim. In applying the wheel, the hub shell is inserted over the end of the shaft until said shell engages the backing disk 18. Thereafter, the cone is slipped over the shaft end and the nut 20 is applied. In drawing up the nut, the cone is forced inwardly on the shaft not only to center the wheel on the shaft, but to clamp the same to the shaft to rotate therewith. When demountable rims of any well known type are to be operated upon, a suitable adapter (not shown) is provided to carry the rim and such an adapter is detachably secured to the shaft in the manner above described with respect to the wheel.

When the machine is in operation, the rim supporting shaft 17 is continuously rotated at a relatively slow speed in one direction by the following means. Disposed on the base 11 is a motor 24 with its armature shaft 25 arranged parallel with the rim supporting shaft 17. On that end of the armature shaft, facing the end wall 14, is a pulley 26, the purpose of which will later appear. On the other end of the armature shaft which faces the end wall 15 is a worm pinion 27 that meshes with a worm gear 28 fixed to an upright shaft 29. This shaft, as herein shown, is journalled at its top end in an inwardly extending bracket 31 on the end wall 15. On the top end of the upright shaft, below said bracket, is a worm pinion 32 that meshes with a worm gear 33 on the rim supporting shaft. It is apparent that when the motor 24 is energized, the shaft 17 is driven at the desired reduced speed through the worm gearing mentioned.

34 indicates a horizontal shaft, parallel with the rim supporting shaft and journalled at its ends in suitable bearings provided therefor in the end walls 14—15 adjacent that corner of the casing defined by the meeting corner of the front and top walls of the casing. Loose on said shaft is a combined pulley and clutch member 35, which, as herein shown, is driven by a belt 36 from the pulley 26 before mentioned.

37 indicates a swinging brush shaft frame which includes a pair of frame arms 38—39 connected together at a point between their ends by a tie bar 40. The inner ends of said arms are journalled on the horizontal shaft 34. Journalled in the outer ends of said arms is a brush shaft 41. This brush shaft frame projects through a suitable opening 12a provided in the front wall 12 for that purpose. One end of the brush shaft projects beyond the plane of the end wall 14 and operatively engaged upon said shaft end in the plane of the rim 21 to be refinished, is a cleaning member in the form of a circular wire brush 42. This brush is detachably secured on the shaft end so as to be easily removable for the application of a brush best adapted for use in connection with the particular rim being operated upon. As herein shown, the shaft carries a pin 43 for engagement with bayonet notches 44 in the thimble of the brush, for the purpose of making quick changes of the brush.

To provide for the drive of the brush shaft, a pulley 45 is fixed on the shaft 34 adjacent the frame arm 38. A second pulley 46 is fixed to the brush shaft 41 adjacent the frame arm 38 and a belt 47 connects said two pulleys. On the shaft 34 between the combined pulley and clutch part 35 and the brush frame arm 39 is keyed a clutch collar 48 for engagement with and disengagement from the combined pulley and clutch collar 35. The collar 48 includes a cone 49, the purpose of which will later appear. A spring 50 on the shaft between the brush frame arm 39 and the collar 48 normally urges the collar 48 toward the combined pulley and collar 35 to operatively connect the latter to the shaft 34.

It is apparent that when the motor 24 is energized and the shaft 34 is being driven thereby, the brush shaft 41 is driven in the same direction as the rim supporting shaft 17, but at a greater speed. It is also apparent that the brush shaft frame 37 is capable of being swung about an axis coincident with the axis of the shaft 34 and this without affecting the driving of the brush shaft when said shaft 34 is being driven by the motor.

The brush shaft frame 37 is swingable from a substantially horizontal position in which the brush is out of operative engagement with the rim as shown in Figs. 2 and 5, into its rim engaging position wherein it is inclined downwardly and outwardly from the shaft 34 as appears in Fig. 4. To provide for the movement of the brush frame from one position to the other, as well as to provide for the necessary number of rotations of the rim for the cleaning of the same by means of the brush, the following mechanism is provided.

51—52 indicate a pair of edgewise disposed bars located adjacent and parallel with the end wall 14 below the shaft 17. Each bar has longitudinal slots 53 through which pins 54 extending inwardly from the end wall 14 project to provide a sliding guiding support for said bars. Spacers 55 on said pins keep the bars spaced a suitable distance apart. On the top edge of that end of the bar associated with the front wall 12 is a plurality of longitudinally spaced ratchet-like teeth 56 and on said bar at about the midtooth 56 is a laterally projecting stud 57. On the opposite end of said bar, outside of the rear wall 13 is a handle 58 by which the bar 51 may be moved longitudinally in guided relation on the pins 54.

In the bottom edge of the handle end of the bar is a plurality of notches 59 spaced in accordance with the teeth 56. A spring finger 60 on the rear wall 13 is adapted to yieldingly engage in these notches. At about the middle of the bar is a depending finger 61, which when the bar is moved toward the left in Fig. 2 is adapted to engage the actuator 62 of an electric switch 63 that controls the energizing and deenergizing of the motor 24. On the top edge portion of the handle end of the bar 51 is a spring finger 64 which overhangs and engages upon the top edge of the bar 52.

The bar 52 is provided with teeth 65 similar to the teeth 56 before mentioned. In about the mid portion of the top edge of the bar is a notch 66, into which the spring finger 64 enters to pick up the bar 52 in the final part of the movement of the bar 51 in one direction under the engagement of a tooth 17a on the shaft 17 with the successive teeth 56 of said bar 51. The bar 52 is also provided at its left hand end as shown in Fig. 3, with a handle 67 similar to and associated with the handle 58 on the bar 51 as before mentioned. On the bottom edge of the last mentioned end of the bar 52 is a depending finger 68 which, in the movement of the bar 52 toward the right, as in Fig. 2, is adapted to engage the actuator 62 of the switch 63 to open the switch and deenergize the motor and stop the machine. On the top edge of the bar, somewhat near the notch 66 is a laterally offset stud 69 so arranged as to stand in the path of one end of an actuator arm 70 of control valve 71 for an air line 72. A spring 73 is so arranged with respect to said arm as to operate to return it to a position where it closes off the line. The first mentioned end of the actuator includes a hinged part 74. When the bar 52 moves to the right, as will later appear, the stud 69 engages the hinged part 74 of the arm 70, which part at this time forms a rigid extension of the arm. Thus, in the movement of the bar 52, as mentioned, the stud will swing the arm 70 to open the air line. When the stud 69 has passed under the arm, the spring 73 operates to close the valve 71 and shut off the line 72. On the back stroke of the bar 52, the stud 69 will swing the hinged part 74 out of the way so as to pass the same.

A clutch collar and brush arm actuator 75 is pivoted as at 76 on the end wall 14 adjacent the front wall 12 beneath the bar 51 as best shown in Figs. 2 and 3. This actuator arm is provided at its free top end with an arcuate wedge surface 77 and is provided at a point between its ends with a curved cam surface 78 that faces the front wall 12. The cam surface 78 is adapted for engagement with a horizontal stud 79 on a depending boss 80 on the brush frame 39. When the actuator arm 75 is swung clockwise, when viewed as in Fig. 2, the wedge surface 77 is adapted to engage the cone 49 of the clutch collar 48 to move it against the action of the spring 50 away from and out of engagement with the combined pulley and clutch collar 35 so that the shaft 34 is disconnected from the motor 24. Also, when the actuator arm is swung in the direction described, the cam surface 78 will engage the stud 79 and act thereon to swing the brush supporting frame upwardly into the position shown in Fig. 2 wherein the brush is out of engagement with the channel of the rim.

To hold the actuator arm 75 in this position, the hub portion thereof is provided with a shoulder 81 for engagement by a pawl 82 that is pivotally mounted on the side wall 14 as at 83. The pawl 82 includes a short tooth 84, the purpose of which will soon appear and also carries a finger 85, which, in one position is adapted to engage the hub of the actuator arm to limit the movement of the pawl in a counter-clockwise direction to the position shown in Fig. 4.

On the outside of that corner of the casing as defined by the end wall 14, rear wall 13 and top wall 16, is located a support 86 for a spray apparatus 87. This apparatus is of the kind including a container 88 and a spray nozzle 89 disposed in the vertical plane of the channel of the rim 21 being operated upon. An air supply tube 90 connects this spray apparatus to the outlet side of the valve 71 before mentioned. The container is adapted to hold a rust inhibiting fluid, paint or coating material and when the valve 71 is opened, said fluid is discharged as a spray upon the channel of the rim 21. If desired, lateral guard plates 91 may be provided in connection with the spray apparatus to keep the spray within bounds during spraying operations.

When the machine is not in operation, both bars are in that position shown in Fig. 2, with the motor switch 63 in its off position and with the air valve 71 closed. Also, at this time, the actuator arm 75 is in such position that its wedge surface 77 is in engagement with the clutch cone 49 and has forced the same in a direction toward the wall 14 so that the clutch 48 is out of engagement with the combined clutch and collar 35. At this time the stud 79 will be so engaged with the cam surface 78 of the actuator that the brush arm is in its inoperative position as shown in Fig. 2, out of engagement with the wheel rim. The actuator arm 75 is at this time locked in this position by reason of the engagement of the pawl 82 with the shoulder 81.

Assume now that a wheel has been secured in place upon the end of the shaft 17 as before mentioned. Further assume that the rim channel is so rusty as to require considerable brushing to remove the rust therefrom. The operator then grasps both handles 58—67 and pulls the bars 51—52 out as far as they will go, as permitted by the engagement with the ends of the slots 53 with the pins or studs 54. The ends of the slots 53 and the studs 54 are so relatively formed that the bar 52 pulls out further than the bar 51 for a distance of about a half of that between the teeth 56—65 of the bars 51—52. This positions the teeth 56—65 out of registration with each other and brings one of the teeth 56 of the bar 51 into a position for engagement by the tooth 17a in the rotation of the shaft 17, the teeth 65 of the bar 52 being out of position for engagement by the tooth 17a.

In this movement of the bars, the lug 69 on the bar 52 will merely pass the air valve arm part 74 which will swing out of the way and then drop back into place. Also in the movement of the bars, the stud 57 on the bar 51 will engage the tooth 84 to trip the pawl 82 and swing it counterclockwise out of engagement with the actuator arm shoulder 81. At this time the arm 85 of the pawl will engage the hub of the actuator arm to limit the counterclockwise movement of the pawl as appears in Fig. 4. When the actuator arm is released, the weight of the brush frame will cause it to swing downwardly, throwing the actuator 75 into the position shown in Fig. 4. This releases the clutch 48 so that its spring 50 causes it to engage the combined collar and clutch 35. At this time the brush is in engagement with the channel of the wheel rim.

Also, in the outward movement of the bars, the stud 61 on the bar 51 will have engaged the switch arm 62 and opened the switch 63 so that the motor is energized. With the motor energized, it will drive the shaft 17 at a slow speed and through the shaft 34 and belt 47 will drive the brush in the same direction at a speed much higher than that of the wheel rim.

Thus, the brush is rotating at a high peripheral speed in engagement with the channel of the rim, but due to the worm gearing employed in driving the shaft 17, the brush can have no retarding effect on the rim or tend to drive it in the opposite direction. In other words, the drive for the rim is positive.

In the rotation of the shaft 17, its tooth 17a will engage one of the teeth 56 of the bar 51 and in each successive rotation will engage successive teeth in the bar to feed the same inward of the casing, step by step. In this movement of the bar 51, the bar 52 will remain passive and the finger 64 will slide along the top edge of the bar 52. During this feed of the bar 51, the spring finger 60 will snap out of and into successive notches 59 in the bottom edge of the bar 51. As the last tooth 56 approaches a position to be engaged by the tooth 17a, the finger 64 will slip into the notch up against the shoulder 66 and will pick up the bar 52 for movement so as to bring one of its teeth 65 into position to be engaged by the tooth 17a. When said bar 52 is picked up, the last tooth of the bar 51 will have been engaged by the tooth 17a so that thereafter no further movement in the feeding direction is imparted to said bar.

As the bar 52 is now being fed step by step inwardly, its lug 69 will engage the air valve arm portion 74 and swing the valve arm 70 to open the valve 71. As will be apparent, this only occurs after the wheel rim 21 has made several revolutions with the brush 42 in engagement with the inside of the channel thereof.

As the bar 51 reaches its inward limits of travel, the stud 57 will engage the actuator arm 75 and will swing it upwardly into the position shown in Fig. 2. In this movement of the actuator arm, the clutch 48 is disengaged from the combined clutch and collar 35 so that the brush will stop. At this time, the actuator cam surface 78 will engage the stud 79 on the brush frame which is then swung upwardly to bring the brush into an out of engagement position with respect to the rim. At this time the pawl 82 drops behind the shoulder 81 and locks the parts in this position.

This disconnection of the brush, as well as the swinging of the same into its inoperative position, occurs just previous to the opening of the valve 71 and this in no way affects the rotation of the shaft 17 so that the rim 21 is still rotating. During the time the valve 71 is open, air, under pressure, is being delivered to the spray apparatus 87 which sprays a rust inhibitor material upon the cleaned inside channel of the rim.

As the last tooth 65 of the bar 52 passes from under the influence of the tooth 17a, the stud 68 on the bar 52, engages and actuates the arm 62 of the switch 63 and this deenergizes the motor and stops the entire machine.

The refinished wheel, which was previously cleaned and then sprayed with a rust inhibiting coating may now be removed from the machine, first by taking off the nut 20 and then the cone 19.

Should a demountable rim of any sort be next operated upon, the rim is secured to a suitable adapter and the adapter applied to the end of the shaft 17, in the same manner as before described in connection with the wheel.

Assume that the rim to be refinished requires but a small amount of cleaning. In this instance, both bars 51—52 will be pulled clear out as before and this starts the machine into operation. However, as the shaft 17 is rotating slowly, the operator pushes the bar 51 inwardly the distance of a desired number of teeth 65, as defined by the notches 59. When the finger 60 snaps into the desired notch, this sets the machine so that only a few rotations are possible for the rim, after which the brush is disengaged therefrom, the spraying of the rim occurs and then the machine is stopped, all as previously described.

The machine will handle any size rim within reason and will clean and refinish the inside of the channel thereof in a minimum of time. After once set in operation, it is automatic in such operation and will stop when the rim has been refinished. The machine is simple and efficient in operation and is a practical and handy adjunct for any shop wherein tire changes are made.

While in describing the invention, we have referred in detail to the form, arrangement and construction of the parts thereof, the same is to be considered only in the illustrative sense so that we do not wish to be limited thereto except as may be specifically set forth in the appended claims.

We claim as our invention:

1. In a machine of the kind described, means for rotatively supporting a wheel rim, a rotary cleaning member, means for supporting the same for movement into and out of engagement with the inside of the channel of the rim, a main driving means, means between said main driving means and wheel supporting means for driving the same, and means operative to connect said cleaning member with said main driving means when it is in engagement with said rim channel and to disconnect the same from said main driving means when it is out of engagement with said rim channel.

2. In a machine of the kind described, means for rotatively supporting a wheel rim, a power driven cleaning member, means for supporting said cleaning member for a swinging movement into and out of engagement with the inside of the channel of the rim, a main driving means, means between said main driving means and said wheel supporting means for driving the latter, and means operative to swing said cleaning member supporting means into and out of engagement with said rim channel and for connecting and disconnecting said cleaning member to and from said main driving means.

3. In a machine of the kind described, means for rotatively supporting a wheel rim, a power driven cleaning member, means for supporting said member for movement into and out of engagement with the inside of the channel of the wheel rim, a main driving member, means for driving the rim supporting means, means operative to drive the cleaning member from said main driving member, and means for controlling said main driving member to start and stop the same, said last mentioned means also controlling the movement of said cleaning member supporting means for causing engagement with and disengagement of said cleaning member from said rim channel.

4. In a machine of the kind described, means for rotatively supporting a wheel rim, a power driven rotary cleaning member, means for supporting said cleaning member for a swinging movement into and out of engagement with the inside of the channel of said rim, a main driving member, means for driving said rim supporting means from the main driving member, means for controlling said main driving member to start and stop the same, and means actuated by said controlling means for moving the rotary cleaning member into and out of operative engagement with the channel of the rim and for connecting it to and for disconnecting it from the main driving member.

5. In a machine of the kind described, means for rotatively supporting a wheel rim, a power driven cleaning member, means for moving said cleaning member into and out of engagement with the inside of the channel of said rim, a main driving member for driving said wheel supporting means and said cleaning member, means for controlling the starting and stopping of said main driving member, said controlling means operating automatically first to disconnect the said cleaning member from said main driving member and move it out of engagement with the rim and then to stop said main driving means.

6. In a machine of the kind described, means for rotatively supporting a wheel rim, a power driven cleaning member mounted for movement into and out of engagement with the inside of the channel of said rim, a main driving member for driving said wheel supporting means and said cleaning member, means manually operable in one direction for starting the main driving member and for moving said cleaning member into engagement with said rim channel, said manually operable means being operable in the other direction by means of a part of said wheel supporting means for moving the cleaning member out of engagement with the rim channel and then operating to stop said main driving member.

7. In a machine of the kind described, means for rotatively supporting a wheel rim, a power driven cleaning member mounted for movement into and out of engagement with the inside of the channel of the rim, a motor, means for driving said wheel supporting means and said cleaning member from said motor, means for controlling the starting and stopping of said motor comprising a pair of members mounted for endwise movement, one of said members, when moved in one direction, operating to engage the cleaning member with the rim channel and to start the motor, means actuated from said wheel rim supporting means for moving said one of said members in the other direction to move said cleaning member out of engagement with the wheel rim, said other member, when moved in the other direction a predetermined distance, operating to stop the motor.

8. In a machine of the kind described, means for rotatively supporting a wheel rim, a power driven cleaning member mounted for movement into and out of engagement with the inside of the channel of the rim, a motor, means for driving said wheel rim supporting means and said cleaning member from said motor, means for controlling the starting and stopping of said motor comprising a pair of members mounted for endwise movement, one of said members when moved in one direction, operating to engage the cleaning member with the rim channel and to start the motor, power driven means operating to move one of said members in the other direction to move said cleaning member out of engagement with the wheel rim, means operating automatically when said member moves in said other direction, to pick up said second member to move it in said other direction, said second member, at a predetermined point in its movement in said other direction, operating to stop the motor.

9. In a machine of the kind described, wheel rim supporting means and a cleaning member movable into and out of engagement with the inside of the channel of the wheel rim, a motor for driving said supporting means and cleaning member respectively, controlling means for said motor comprising a pair of bars mounted for endwise movement, means actuated by one of said bars when moved in one direction for engaging the cleaning member with the wheel rim and for starting the motor, power means for moving said one of said bars in the other direction, said bar, when moving in the other direction, operating to pick up the second bar for movement therewith, said second bar in said movement thereof, operating to stop the motor.

10. In a machine of the kind described, means for rotatively supporting a wheel rim, a power driven cleaning member mounted for movement into and out of engagement with the inside of the channel of the wheel rim, a motor, means for driving the wheel rim supporting means and the cleaning member from the motor, means for applying a coating material upon the wheel rim channel, means manually movable in one direction, for bringing the cleaning member into engagement with the wheel rim channel and for starting the motor, power means for moving said manually movable means in the other direction, said manually movable means in its movement in the other direction, operating to remove the cleaning member from said rim and further operating in one part of its movement, to actuate said coating applying means and then operating in another part of its movement, to stop the motor.

ELI PEDERSEN.
WILLIAM J. SCHULTZ.